United States Patent [19]
Klein et al.

[11] Patent Number: 5,329,626
[45] Date of Patent: Jul. 12, 1994

[54] SYSTEM FOR DISTRIBUTED COMPUTATION PROCESSING INCLUDES DYNAMIC ASSIGNMENT OF PREDICATES TO DEFINE INTERDEPENDENCIES

[75] Inventors: Johannes Klein, San Francisco; Alberto Lutgardo; Edward Y. Chang, both of Santa Clara; Edward C. Cheng, S. San Francisco; Dora L. Lee, San Francisco; Edward S. Lu, San Bruno, all of Calif.

[73] Assignee: Digital Equipment Corporation, Maynard, Mass.

[21] Appl. No.: 601,990

[22] Filed: Oct. 23, 1990

[51] Int. Cl.$^5$ .............................. G06F 15/16
[52] U.S. Cl. .................... 395/375; 395/650; 395/800; 364/232.22; 364/230; 364/DIG. 1
[58] Field of Search ............... 395/375, 575, 600, 800, 395/200, 650

[56] References Cited

U.S. PATENT DOCUMENTS

| | | | |
|---|---|---|---|
| 4,503,499 | 3/1985 | Mason | 395/650 |
| 4,769,771 | 9/1988 | Lippmann | 395/200 |
| 4,819,159 | 4/1989 | Shipley et al. | 395/575 |
| 4,891,753 | 1/1990 | Budde et al. | 395/375 |
| 4,903,196 | 2/1990 | Pomerene et al. | 395/375 |
| 4,926,323 | 5/1990 | Baror | 395/375 |
| 5,021,945 | 6/1991 | Morrison et al. | 395/375 |

FOREIGN PATENT DOCUMENTS 251584  6/1987  European Pat. Off. .

OTHER PUBLICATIONS

Ancilotti et al., A Distributed Commit Protocol for a Multicomputer System, May 1990, pp. 718–724, IEEE Transactions on Computers, vol. 39, No. 5.
Bernstein, Goodman and Lai, "Analyzing Concurrency Control Algorithms When User and System Operations Differ", IEEE Transactions on Software Engineering, vol. SE-9, No. 3, pp. 233–239 (May 1983).
Calton, Pu, "Superdatabases for Composition of Heterogeneous Databases," IEEE Proceedings of the 4th Data Engineering Conference, CH 2550-2, pp. 548–555 (1988).
Leslie Lomport, "Time, Clocks, and the Ordering of Events in a Distributed System," Communications of the ACM, vol. 21, No. 7, pp. 558–565 (1978).
Maurice Herlahy, "Optimistic Concurrency Control for Abstract Data Types," Proceedings of Principles of Distributed Computing Conference, ACM, pp. 206–217 (1986).
David P. Reed, "Implementing Atomic Actions on Decentralized Data," ACM Transactions on Computer Systems, vol. 1, No. 1, pp. 3–23 (Feb. 1983).
Philip A. Bernstein and Nathan Goodman, "Concurrency Control in Distributed Database Systems," Computing Surveys, vol. 13, No. 2, pp. 185–221 (Jun. 1981).
European Search Report; EP 91 30 8669; Mar. 10, 1993.
"Transaction Processing Primitives and CSP"; J. C. P. Woodcock; IBM J. Res. Develop, vol. 31, No. 5; Sep. 1987; pp. 535–545.
"Nested Transactions: An Approach to Reliable Distributed Computing"; J. Eliot B. Moss; 1985; The MIT Press; pp. 68–92.
"On the State of Affairs in OSI Transactions Processing"; Jurgen M. Janas et al.; IEEE Comp. Soc. Press; 1988; pp. 53–61.

*Primary Examiner*—Thomas C. Lee
*Assistant Examiner*—Jennifer M. Orzech
*Attorney, Agent, or Firm*—Flehr, Hohbach, Test, Albritton & Herbert

[57] ABSTRACT

During the processing of a transaction or other distributed computation, a computation management system creates a number of agents to handle various aspects or portions of the computations to be performed. Each agent progresses through a predefined set of state transitions which define the status of the agent at any point in time. The computation management system defines for each agent a set of dependencies, each dependency corresponding to a state transition which will be blocked until a particular state transition occurs in another specified agent. By defining selected combinations of dependencies for each agent, a variety of different interdependencies and cooperating protocols can be implemented. The distributed processing management system can be used both for managing transaction processing and for synchronizing events in other types of distributed computations.

12 Claims, 7 Drawing Sheets

SYSTEM FOR DISTRIBUTED COMPUTATION PROCESSING INCLUDES DYNAMIC ASSIGNMENT OF PREDICATES TO DEFINE INTERDEPENDENCIES

The present invention relates generally to distributed database systems and transaction processing computer systems, and is particularly related to methods and systems for synchronizing computations in distributed computer systems.

BACKGROUND OF THE INVENTION

Referring to FIG. 1, the present invention concerns interactions and interdependencies of agents 102-1 through 102-N cooperating in a distributed processing computer system 100. Depending on the operating system used, each agent may be a thread or process, and thus is a unit that executes a computation or program. Some of the agents 102-1 through 102-N may be executing on a single common data processing unit while others are executing at remote sites on other data processing units. More generally, agents can be hosted on different computer systems using different operating systems. For the purposes of the present discussion, it is sufficient to assume that there is a communications path or bus 110 which interconnects all the agents in the system 100.

In a typical system 100, some of the agents will be resource managers, such as a database management server (DBMS), while other agents will be computational units working directly on behalf of the users of the system. For those not familiar with transaction (database) processing, a DBMS is a program which handles all access to a particular database, thereby relieving users of the system from having to deal with such complicated technical problems as efficiently storing data and sharing data with a community of users.

In a transaction processing system such as an airline reservation system, agents will be created dynamically as requests are made at reservation terminals. Each agent is created by portions of the system to handle various aspects of the work associated with any particular query or set of queries or updates being sent by a particular reservation terminal.

The present invention concerns a general methodology for interlinking these agents 102 so as to maintain data consistency and to define and enforce interdependencies between the calculations being performed by various ones of the agents. For instance, one agent 102-1 might generate a query that results in the formation of two child agents 102-2 and 102-3, each of which will handle database operations in different portions of the distributed database. At the time that the two child agents 102-2 and 102-3 are created, the present invention defines exactly how these agents are interdependent, and sets up the necessary data structures to denote those interdependencies, as will be explained in more detail below.

Each agent 102 represents a particular computation as a finite state machine which progresses through a sequence of internal states. Complex computations are mapped by their agents into simpler sets of states suitable for synchronization with other computations. A typical sequence of state transitions for an agent is shown in FIG. 2. Definitions of the states 121-127 for the agent shown in FIG. 2 are listed in Table 1.

TABLE 1

| REF | STATE NAME | DESCRIPTION |
| --- | --- | --- |
| 120 | Active | Performing a computation |
| 121 | Finishing | Computation is complete and waiting for one or more finish pre-conditions to be satisfied |
| 122 | Finished | Computation is complete and all finish pre-conditions have been satisfied |
| 123 | Preparing | Check on whether agent is able to commit the transaction |
| 124 | Prepared | Agent is prepared to commit or abort |
| 125 | Committing | Agent is unconditionally committed. Results of computation become visible. |
| 126 | Aborting | Rollback objects affected by computation so as to leave everything as it was before computation began |
| 127 | Forgotten | Computation completed or aborted and purged from system |

In a typical transaction processing system, the process running in an Agent can be aborted due to an internal error condition at any time until the processes is prepared. Typical internal error conditions which might cause a process to abort include a "divide by zero", an attempt to execute an illegal instruction due to a programming error, an unauthorized attempt to access privileged system resources, or the unavailability of a resource needed to complete the computation. Once the agent has prepared, this means that the agent guarantees that it can save the results of its computation in a permanent fashion if the distributed transaction commits, and that it can rollback the results of the transaction so as to leave everything as it was before the transaction began should the distributed transaction fail to commit.

The present invention provides a very general and flexible system and method for making state transitions in each agent dependent on the status of other agents cooperating in the distributed process.

"STANDARD" TWO PHASE COMMIT PROTOCOLS.

The prototypical situation discussed in the "transactional processing" computer science literature is a distributed database management system. More particularly, there is a well known prior art protocol used in transactional processing called "two phase commit", often abbreviated as 2PC. There are many variations of 2PC used in commercial systems and/or discussed in the literature, some of which will be discussed in detail below.

It is important to note that the present invention is not simply a method of implementing two phase commit protocols. To the contrary, the present invention provides a method of defining and enforcing a wide range of interdependencies between cooperating agents. On the other hand, it is important to understand how at least a standard two phase commit protocol works.

Referring to FIG. 3, "standard" two phase commit works as follows. A transaction T1 involves at least two data processing units. For example, the transaction may involve three agents, herein called Agent A 130, Agent B 132 and Agent C 134. Assuming that nothing goes wrong during execution of the transaction T1, each agent performs the computations associated with the transaction and stores new values computed during the transaction in such a way that the transaction can still be reversed or aborted, thereby leaving the database unchanged. As will be understood by those skilled in the art, there are a number of different methods of doing such "rollbacks" and the particular method used for making the transaction reversible is not important to the present invention.

At some point in the transaction, one of the Agents, here Agent C, is assigned the role of "coordinator" of the two phase commit protocol. The coordinator sends a first message, called a Prepare message 140, which notifies all Agents to the distributed transaction that the transaction is now to be terminated, and hopefully committed. Each Agent to the transaction then attempts to Prepare itself. Essentially, this means that the state of the database before the transaction and the state of the database after the transaction are durably stored. The Agent thus checks that either one of these states can be guaranteed to be installed, depending on whether the transaction COMMITs or ABORTs.

Each Agent then votes on the disposition of the transaction by sending a READY or ABORT message 142 back to the coordinator. If the attempt by an Agent to prepare fails, or any preceding step of the transaction fails, the Agent votes to ABORT. If the attempt to prepare succeeds, then the Agent votes READY (i.e., that it is ready to commit). Any Agent that has voted READY is said to be prepared.

When the coordinator has received votes from all the Agents participating in the transaction, it knows the disposition of the transaction. The coordinator COMMITs the transaction if all Agents have voted READY. If any Agent voted ABORT, or an Agent fails to respond to the Prepare message within a predefined amount of time, then the coordinator ABORTs the transaction. In either case the coordinator sends a transaction disposition message 144 (i.e., COMMIT or ABORT) to all Agents.

When an Agent receives the transaction disposition message, it terminates the transaction according to its direction. If the disposition is COMMIT, the agent installs updated data values in the database. If the disposition is ABORT, the state of the database before the transaction is re-installed. The Agents send an acknowledgement message 146 back to the coordinator 134 upon stably storing the transaction disposition.

It should be noted that the Agent 134 which acts as coordinator performs the same functions as the other Agents during the 2PC protocol, except that it starts the 2PC protocol and it collects the READY/ABORT votes of the other Agents. Furthermore, this Agent goes through the prepare and commit phases of the transaction. For all intents and purposes, the coordinator can be thought of as a separate entity, even though it runs on the node of the system occupied by one of the Agents.

OTHER TYPES OF PROTOCOLS AND INTER-AGENT DEPENDENCIES

It should be noted that there are a number of multiphase commit protocols known in the prior art. There are also a number of different versions of the two-phase commit protocol described above.

One basic limitation of 2PC protocols, regardless of the particular type of 2PC protocol used in any particular system, is the fact that there is just one type of interdependency between agents—that is the only type of interdependency in such a system is the "2PC type" of interdependency. There is generally no provision for having multiple types of interdependencies within a single distributed system, and most definitely no provision for having different types of dependencies between various agents of a single transaction.

Another basic limitation in 2PC protocols is that the 2PC protocol is generally considered to define a single unitary relationship between a set of cooperating agents. The software for handling the 2PC software is generally a hardwired type of program which does not vary from situation to situation. This makes is rather difficult to form communications between two computer or transactional processing systems which use different 2PC protocols.

However, in the realm of transactional processing and other distributed processes, there are wide number of different types of interagent dependencies which are useful in different situations. For instance, in some instances, it may only be necessary for one agent to finish its computation before another agent is allowed to finish. In an other example, agents may be "nested" so that the nature of the dependence of one agent on a second agent depends on whether that second agent finishes or fails to finish its computation.

More generally, given any set of state transitions that may be defined for a particular agent, it would be useful to be able to make each of those state transitions dependent on the status of one or more other agents. Furthermore, the set of dependencies between each pairing of agents may depend (i.e., they may differ, depending) on the roles those agents are playing in a particular transaction. 2PC does not provide any of the flexibility needed for defining and implementing such a wide variety of types of dependencies.

SUMMARY OF THE INVENTION

In summary, the present invention is a system and method for synchronizing portions of a distributed transaction or other distributed computation. During the processing of a transaction, a number of agents will be formed for handling various aspects or portions of the computations to be performed. Each agent progresses through a predefined set of state transitions which define the status of the agent at any point in time. The present invention provides a mechanism and methodology for making the state transitions in these agents dependent on the status of other ones of the cooperating agents.

The computation management system of the present invention defines for each agent a set of dependencies, each dependency corresponding to one or more state transitions which will be blocked until a corresponding state transition occurs in another specified agent. By defining selected combinations of dependencies for each agent, a variety of different interdependencies and cooperating protocols can be implemented. The distributed processing management system can be used for managing both transaction processing and for synchronizing events in other types of distributed computations.

In the preferred embodiment, the primary types of dependencies between computational agents are: (1) finish dependency, in which one agent cannot finish until after a specified other agent finishes or aborts prior to finishing; (2) strong commit dependency, in which one agent cannot commit unless another specified agent has committed or is prepared to commit; and (3) weak commit dependency, in which if one agent finishes, another specified agent cannot commit unless and until the one agent has committed or is prepared to commit.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 4:
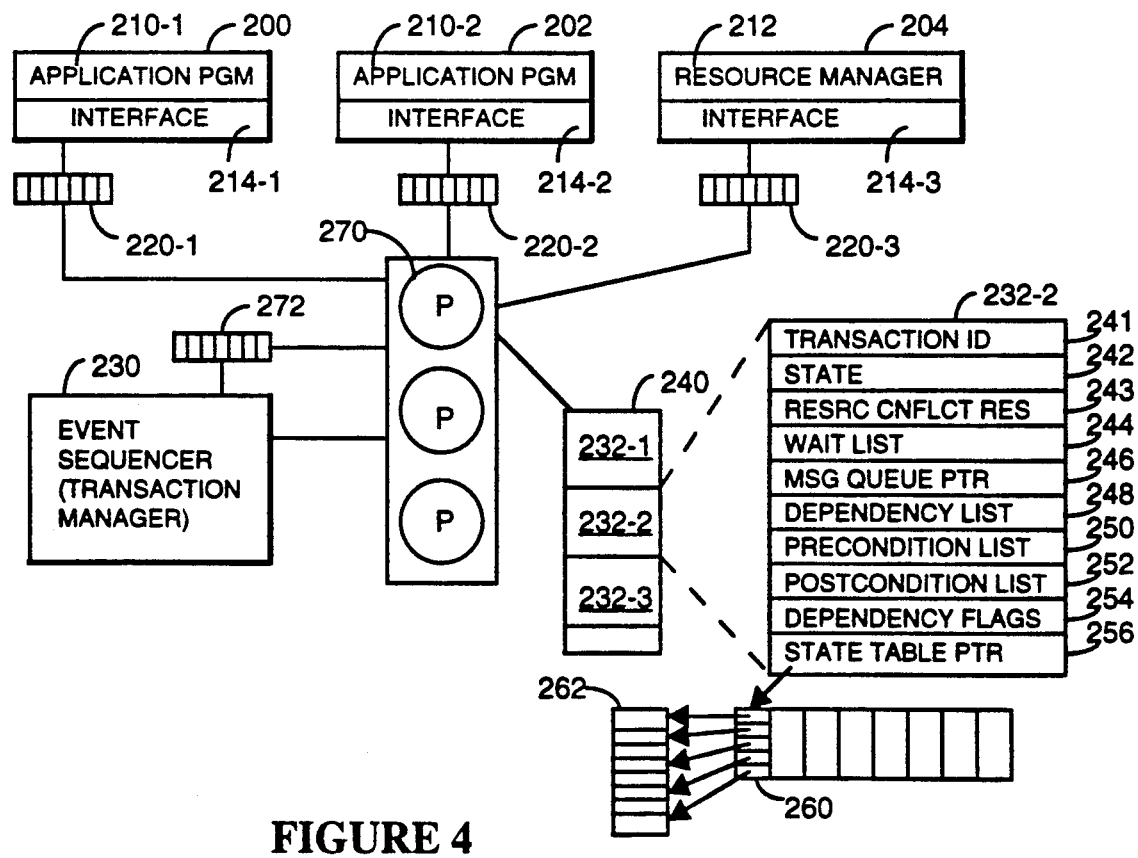
FIG. 4 is a block diagram of the components of a computer system incorporating the present invention.
Figure 5:
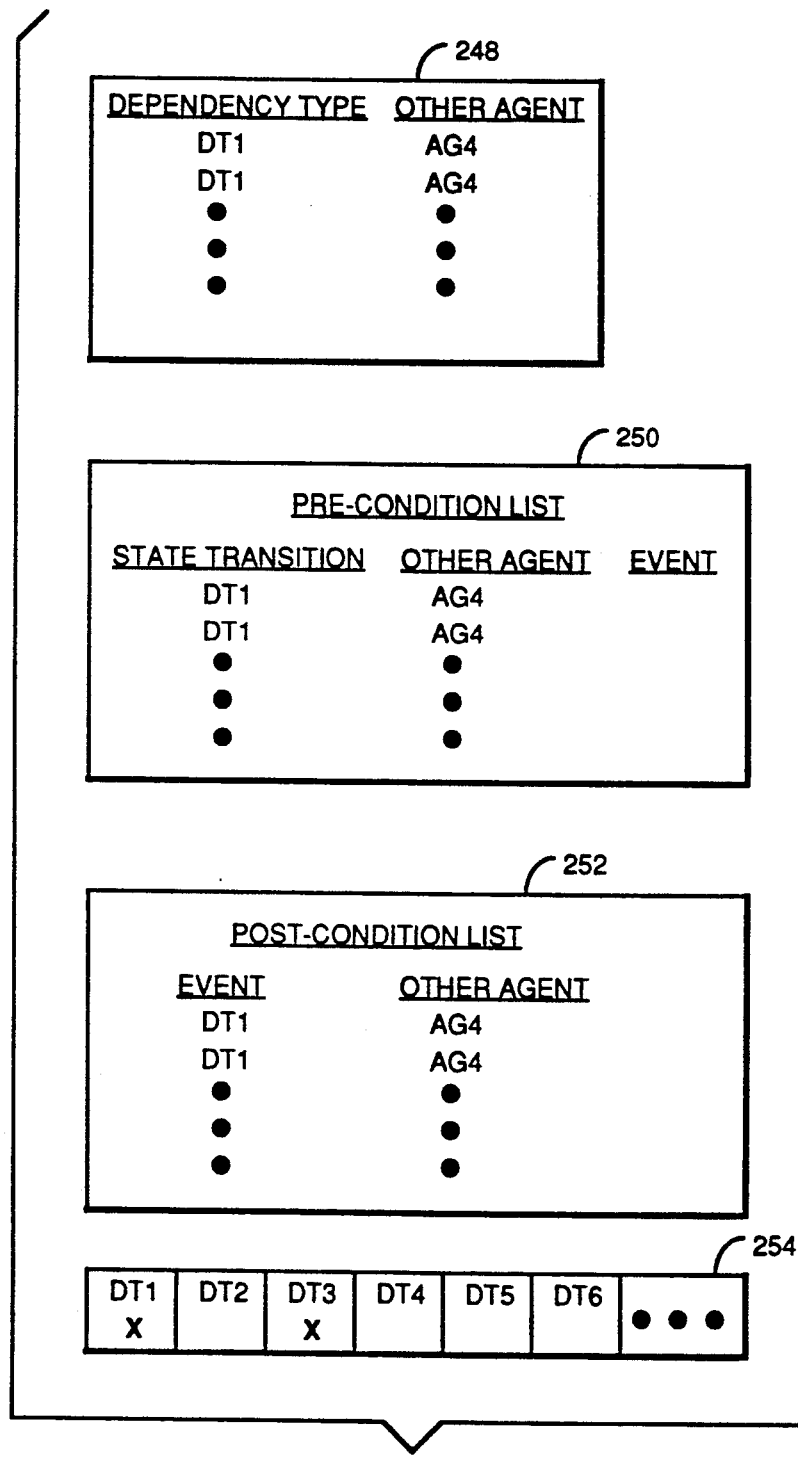
FIG. 5 depicts data structures in an agent control block.

Referring to FIGS. 4 and 5, the present invention provides a system and method for "normalizing" disparate applications and other programs so that the status of each such application and the application's passage through various milestones in its computational process is controllable and accessible to a centralized manager. Another way to look at the invention is that for each distinct program or execution thread, the invention defines a set of states that denote the status of the computation being performed. This set of states is typically very simple, because states are defined only for those state transitions that are relevant to the centralized manager. Even for a database management system which has a virtually unlimited number of possible internal states, the present invention defines an "agent" which has only a handful of "states". Thus, when this document uses the terms "state" and "state transitions" in terms of the present invention, these are the states and state transitions of an agent, not the internal states and state transitions of the agent's application program.

Each agent 200, 202 and 204 in the preferred embodiment consists of an application program 210 or resource manager program 212 coupled to an application interface program 21 4 that implements the state machine for the agent. Each agent also has a message queue 220 for receiving messages.

An event synchronizer 230 comprises the central controller for coordinating (synchronizing) state transitions among the agents of a distributed computation or transaction. In the preferred embodiment, the event synchronizer 230 is called a transaction manager because it performs the functions of a transaction manager in a transaction processing system. For each agent 200, the transaction manager 230 defines and stores a control block 232 in an array of shared memory 240. Each control block 232 includes slots 241-244, 246, 248, 250, 252, 254 and 256 for denoting the following information:

slot 241 denotes the agent's transaction identifier, which is a unique identifier assigned to the agent upon creation of the agent by the transaction manager 230;

slot 242 stores the current state of the agent;

slot 243 stores a pointer to a resource conflict resolution routine, which will be discussed below in the section of this document entitled "Resource Conflict Resolution";

slot 244 is a pointer to a wait list, which is a set of other agents waiting on the agent corresponding to this control block;

slot 246 is a pointer to the agent's message queue 220, which enables the agent to pick up messages sent by the transaction manager;

slot 248 is a list of all the dependencies between the agent corresponding to this control block and other agents;

slot 250 is list of pre-conditions, which are predicates that must be satisfied before a particular state transition in the agent can be allowed to occur;

slot 252 is a list of post-conditions, which are buffered event messages that could not be processed at the time they were received;

slot 254 contains binary "dependency" flags, which facilitate quick checking of the types of dependencies that are present in the dependency list 246; and Slot 256 is a pointer to a state transition table 260, which in turn, denotes the subroutines 262 to be used for responding to each type of message received by the agent.

For instance, if Agent A's state transition from State 1 to State 2 is dependent on Agent B having reached State C, that dependency is denoted in Agent A's dependency list 248, and Agent B's dependency list contains an item that denotes a "negative" or complementary dependency.

The form of the dependency list 248 is shown in FIG. 5. Each item in the agent's list of dependencies 248 is denoted as a dependency type, and the identifier of another agent. The dependency type indicates the type of relationship between the two agents, such as a type of state transition in the agent that is dependent on (i.e., cannot proceed until) a particular state transition in the other agent. Typically, each relationship between two agents is denoted by complementary entries in the dependency lists of the two agents.

Each dependency item is translated into one or more pre-conditions, and corresponding entries are made in the pre-condition list 250. Pre-conditions corresponding to each dependency are denoted in the pre-condition list 250 by listing the state-transition for which a predicate is being defined, the identifier of the other agent on which that state-transition depends, and the event in that other agent which must occur before the denoted state-transition is allowed to proceed.

Post-transition actions in the preferred embodiments are requirements that the agent send a message to another agent when a specified event in the agent occurs. Upon each state transition, the state transition routine which performs that transition inspects the dependency list 248 and sends event messages to each other agent which is dependent on that state transition.

When an event message is received prior to the agent reaching the state in which it would needs that message, such as receiving a commit message while the receiving agent is still active, that message is stored as a post-condition in the post-condition list 252. Each stored post-condition item denotes (1) the state or event in the receiving agent which must be reached before the stored message can be processed, (2) the identity of the sending agent, and (3) the event in the sending agent. Once the receiving agent reaches the denoted state, the post-condition is processed in the same way as a received message (see description of FIG. 7, below).

Some dependency types generate a plurality of post-condition entries in the post-condition list, because the depending agent needs to know not only if a particular normal state transition occurred, but also needs to be informed if an abnormal termination occurred, causing the first agent to abort.

Examples of pre-conditions and post-conditions for specific types of dependencies will be given below.

The control block 232 for each agent is used by both the interface program 214 of each agent and by the transaction manager 230. In particular, prior to each state transition, the interface program inspects the agent's control block 232 to determine whether that state transition is dependent on an event external to the agent (i.e., it depends on the occurrence of an event in some other agent). This is done simply by looking in the control block to see if there is an outstanding pre-condition for that particular state transition. If so, the interface program suspends the agent's application program until such time that all pre-conditions for the state transition are removed by the transaction manager 230.

In addition, each agent's interface program 214 responds to messages from the transaction manager to perform various protocols, such as beginning a computation, aborting the agent's computation, and ending a transaction.

The transaction manager 230 is responsible for enforcing dependencies between agents participating in a transaction, which are denoted in the control blocks 232 of those agents. To do this, the transaction manager 230 generates multiple instances of a transaction processor 270. The transaction processors 270 maintain the control blocks 232 of the agents participating in the transaction, and handle the flow of messages to and from the agents required for continued processing of the transaction.

Messages generated by each agent concerning events in the agent are transmitted to and temporarily stored in the transaction manager's message queue 272. When a transaction processor instance 270 picks up an event message from this message queue 272 (step 300 in FIG. 7), the transaction processor 270 identifies the agent to which the message is directed, if any, (step 302), herein called the depending agent. The processor then selects a transition function 262 based on the state transition table 260 for the depending agent and the current state of that agent (step 304).

Figure 6:
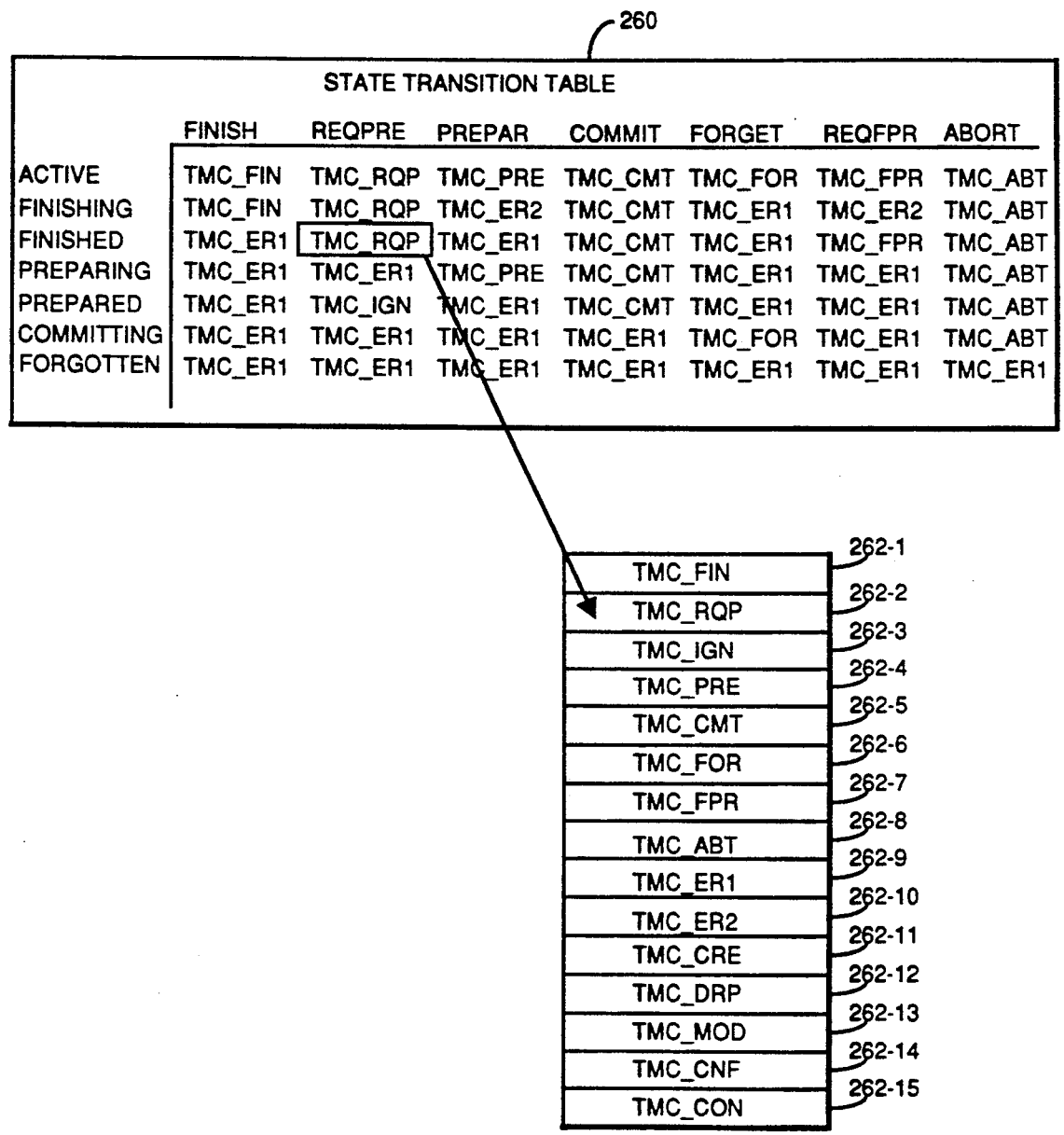
FIG. 6 depicts a state table used to handle the processing of messages received by an agent participating in a distributed transaction in the preferred embodiment.

Referring to FIG. 6, there is shown one example of a state transition table 260 and a corresponding set of transition functions (i.e., subroutines). As can be seen, the way in which a message is processed depends on the current state of the depending agent. For instance, if a first agent is finish dependent on a second agent, a finish message from the second agent should be received by the transaction processor 270 while the first agent is in either the active or finishing states. If a finish message is received while the first agent is in any other, later state, the finish message is either an error, or is a finish message from another agent with which the first agent has a different type of dependency. In either of these cases the finish message should be ignored (which is what the TMCER1 transition function does).

Figure 7:
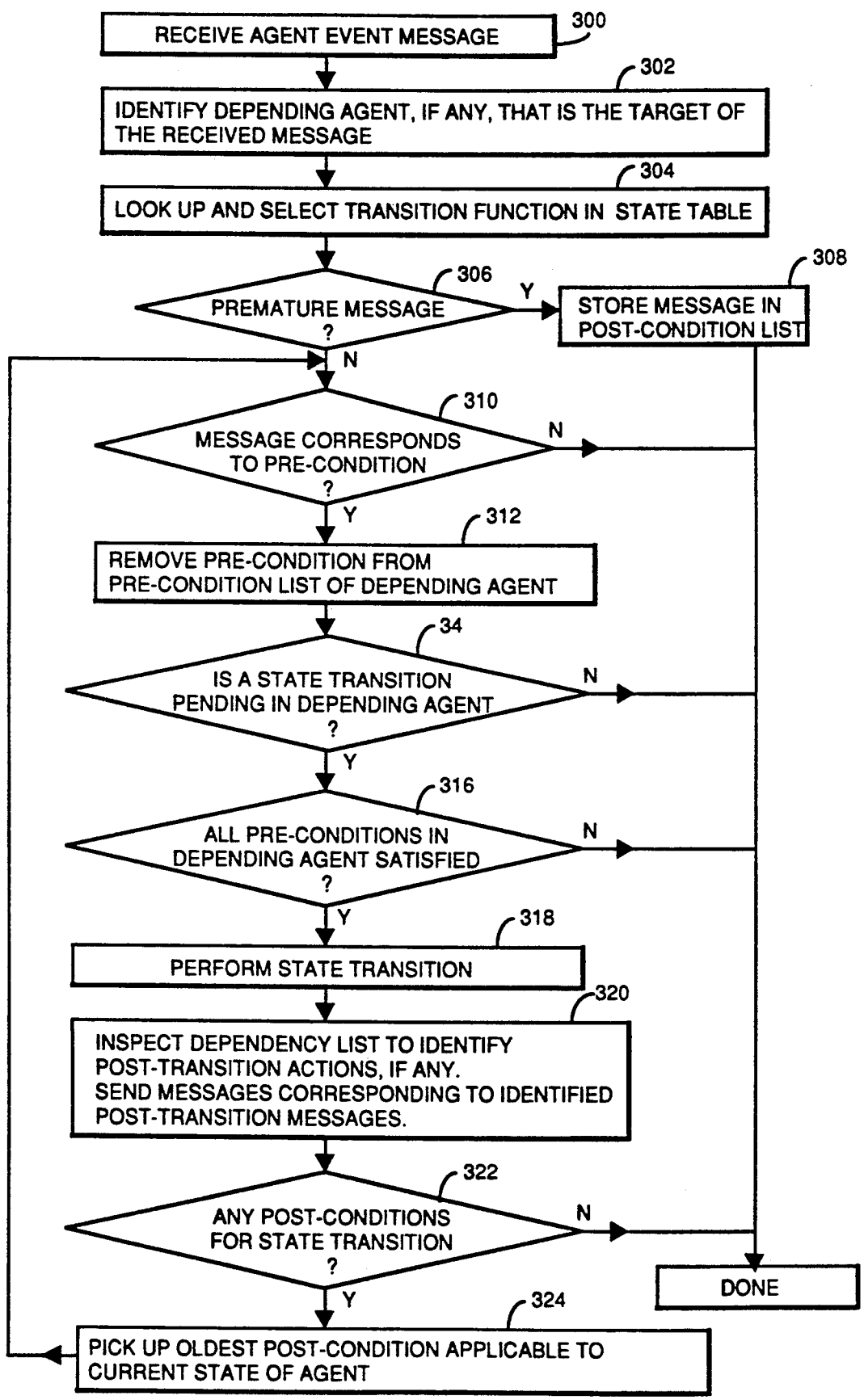
FIG. 7 is a flow chart of the process for handling the receipt of an event message.
Figure 8:
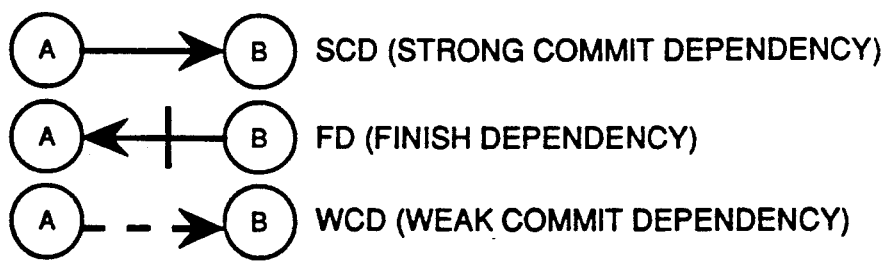
FIG. 8 depicts the symbols used to three types of interagent dependencies.

Referring to FIG. 7, each transition function 262, other than the error condition functions (which deal with erroneous or extraneous messages) and functions which create agents or which modify the dependency list in a control block, when executed by a transaction processor, performs the following functions. If the message concerns an event which is premature (step 306), in that it may be needed for satisfying pre-conditions relevant only to a later state, the message is stored or buffered in the post-condition list 262 (step 308).

If the received message corresponds to a current pre-condition of the receiving agent (step 310), the processor removes that pre-condition from the pre-condition list 260 (step 312). It then checks to see whether there is a state transition that is waiting to occur (step 314). Is so, the processor checks to see if all pre-conditions for that waiting state transition are satisfied (step 316), and performs the state transition (step 31 8)if the pre-conditions are all satisfied. The state change allows the agent to then proceed with the next portion of its computation.

After each state transition in an agent 210, the transaction manager's processor inspects the agent's dependency list to see if there are any post-transition actions that need to be taken. If so, messages are sent to identified agents concerning the occurrence of the state transition. In other words, if there one or more other agents which have dependencies related to the state transition that took place in step 31 8, then messages are sent to those other agents at step 320. Certain types of state transitions, such as a transition to the abort state in a first Agent A, always cause a message to be sent (via the transaction manager) to all the agents which have dependencies on that Agent A.

Finally, the processor inspects the post-condition list 262 to determine whether there are any post-conditions pending for the current state of the agent (step 322). If so, it picks the oldest such a message (step 324) and then goes back to step 310 for processing that message.

Some messages are not "event" messages and thus are handled differently that the method shown in FIG. 7. For example, a CREATE message causes the transaction manager's processor to execute the TMC_CRE routine, which creates a new agent for the application which generated the CREATE message. A DROP message causes the transaction manager to run the TMC_DRP routine, which deletes specified dependencies from an agent. A MODIFY message causes the transaction manager to invoke the TMC_MOD routine, which modifies or adds new dependencies to an agent's control block.

The transition functions used in the preferred embodiment are shown in Table 2.

TABLE 2

| REF | SUB-ROUTINE | DESCRIPTION |
| --- | --- | --- |
| 262-1 | TMC_FIN | Remove finish pre-condition, if any, for finish dependencies |

TABLE 2-continued

| REF | SUB-ROUTINE | DESCRIPTION |
|---|---|---|
| 262-2 | TMC_RQP | Begin preparing |
| 262-3 | TMC_IGN | Ignore request to prepare |
| 262-4 | TMC_PRE | Remove prepare pre-condition, if any, for commit dependencies |
| 262-5 | TMC_CMT | Remove Commit pre-condition, if any, for commit dependencies |
| 262-6 | TMC_FOR | Forget transaction |
| 262-7 | TMC_FPR | Fast prepare: transfers commit coordinator to the receiver of the message. |
| 262-8 | TMC_ABT | Abort transaction |
| 262-9 | TMC_ER1 | Single Error: event received which should not have been received. Create message re same. |
| 262-10 | TMC_ER2 | Double Error: erroneous event received, and agent is also in an erroneous state based on existing dependencies. |
| 262-11 | TMC_CRE | Create New Agent: this is a request by an application for the transaction manager to create an agent and begin a transaction. |
| 262-12 | TMC_DRP | Drop dependencies: delete specified dependencies from specified agent's control block. |
| 262-13 | TMC_MOD | Modify dependencies: modify specified dependencies in specified agent's control block. |
| 262-14 | TMC_CNF | Query Conflict: potentially conflicting requests for use of a resource are checked to determine whether simultaneous access is allowed. |
| 262-15 | TMC_CON | Connection Granted: connection between processes is established. |

The entries in the state transition table 260 for each agent can be different, because the transition subroutines needed by an agent depend on that agent's dependencies. In other words, an agent with a strong commit dependency on one or more other agents will have a different state transition table 260 than an agent having only finish dependencies on other agents. Appendix 1 hereto shows a sampling of state transition tables for various combinations of dependencies.

SPECIFIC EXAMPLES OF DEPENDENCIES

The invention as described above can be applied to any distributed computation or distributed processing situation in which there is a need to coordinate state transitions among the participating agents. The following is a description of a system using three types of dependencies, and how those dependencies can be used to form a commit protocol for a distributed transaction processing system.

Figure 1:
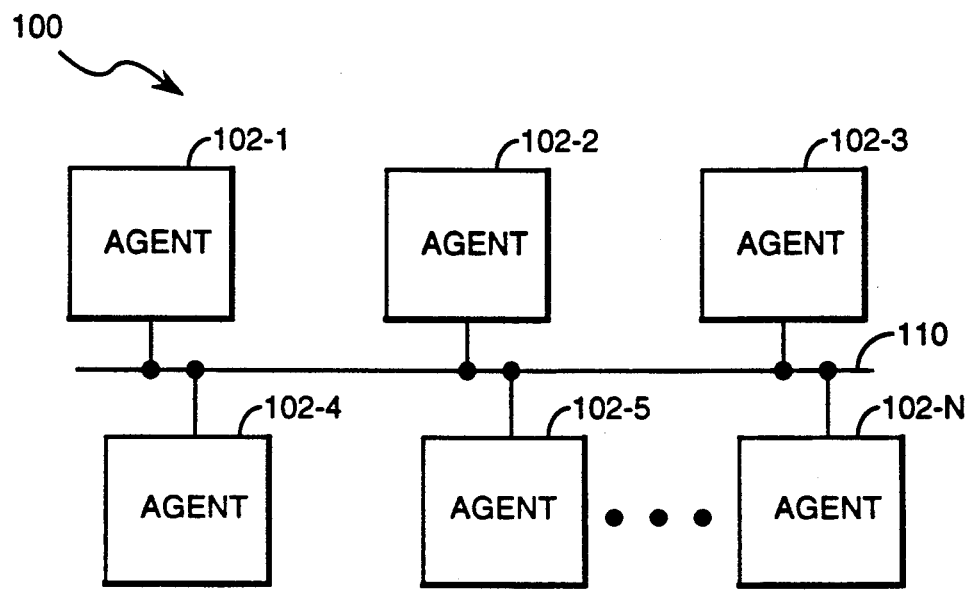
FIG. 1 is a block diagram of a distributed data processing system with a number of interdependent agents.
Figure 2:
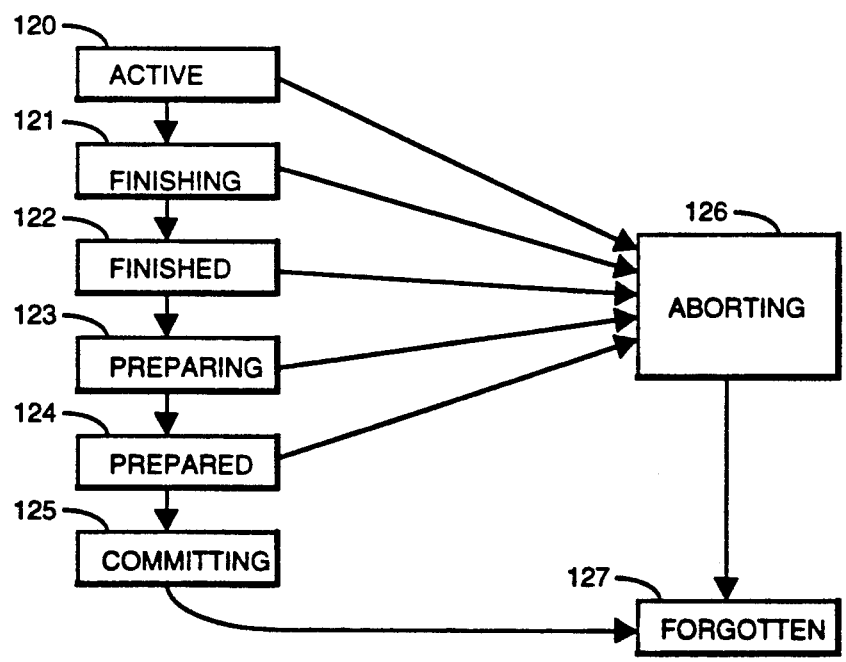
FIG. 2 schematically depicts a set of state transitions in an agent.

In this preferred embodiment, each agent of a transaction is modeled as a finite state machine having the states shown in FIG. 2. Furthermore, the set of messages which each agent can receive, either from the transaction manager, or from another agent, denoted here as Agent X, includes:

| MESSAGE TYPE | DESCRIPTION |
|---|---|
| Request Create | Create a dependency relationship |
| Drop | Drop a dependency relationship |
| Finish | Agent X has finished |
| Request Prepare | Receiving agent requested to prepare |
| Prepared | Agent X has prepared |
| Commit | Agent X has committed |
| Forget | Forget the transaction (after committing or aborting) |
| Abort | Abort transaction |
| Failure | Failure in Agent X |
| Time-out | Transaction has timed out |
| Rollback | Rollback results of receiving agent's computation |
| Query Conflict | Message from Resource Manager asking transaction manager to resolve possibly conflicting requests for access to a resource |

In the preferred embodiment a "prepared" message is used to convey a promise: the agent sending a "prepared" message promises to commit if the recipient of the prepared message commits (i.e., the agent sending the prepared message is prepared to either commit or abort). This "prepared" message is equivalent to "ready" message described above with respect to FIG. 2.

Referring to FIGS. 8 through 11, the three types of dependencies used in the preferred embodiment are herein called (1) strong commit dependency, which is symbolized by a solid arrow, (2) weak commit dependency, which is symbolized by a dashed arrow, and (3) finish dependency, which is symbolized by a solid arrow with a perpendicular line through it.

A strong commit dependency (SCD) is defined as follows. If Agent A is strong commit dependent on Agent B:

1) Agent A cannot commit unless either Agent B has already committed or Agent B will eventually commit, 2) if Agent B aborts, Agent A must abort, and 3) if Agent A aborts, Agent B need not abort, unless there is another dependency relationship between Agents A and B which so requires.

A weak commit dependency (WCD) of Agent A on Agent B requires:

1) if Agent B has become finished, then Agent A becomes strong commit dependent on Agent B, 2) after Agent B finishes, if Agent B aborts, then Agent A must abort, 3) before Agent B finishes, if Agent B aborts, Agent A need not abort, and 4) if Agent A aborts, Agent B need not abort.

When Agent A is finish dependent (FD) on Agent B, before Agent A can finish, Agent B must have already finished or it must be known that Agent B will never finish.

Notification Dependency Types. Each dependency between two agents creates one or more pre-conditions in at least one of the agents. For each such pre-condition in one agent there is a corresponding notification action in the other agent. The notification action is a requirement that a message be sent so as to satisfy a particular pre-condition in a particular agent. Thus, a pre-condition in Agent A which depends on Agent B requires a notification action in Agent B. That notification action, herein called a notification dependency, is invoked when a corresponding event (i.e., state transition) occurs in Agent B, causing Agent B to send an event message to Agent A. For instance, if Agent A is finish dependent on Agent B, then Agent B will have a notification dependency on Agent A, causing it to send a "finish event message" to Agent A when Agent B reaches the finished state. Also, if Agent B aborts prior to finishing, it will send an abort message to Agent A.

When Agent A is strong commit dependent (SCD) on Agent B, Agent B is said to be notification strong commit dependent (NSCD) on Agent A. In other words, a strong commit dependency on Agent B is listed in the dependency list of the control block for Agent A, and a corresponding notification strong commit dependency on Agent A is listed in the dependency list of the control block for Agent B. Similarly, a notification weak commit dependency is noted in the control block of an Agent B when another agent is weak commit dependent on Agent B, and a notification finish dependency is noted in the control block of Agent B when another agent is finish dependent on Agent B.

These "notification" dependencies are used by the transaction manager to generate post-transition actions which prompt the transmission of messages required for implementing the corresponding "positive" dependency. In other words, the post-transition action corresponding to a notification dependency causes a message to be sent which will satisfy a pre-condition in another agent. For example, if Agent A is finish dependent on Agent B, a notification finish dependency will be included in Agent B's control block. As a result, when Agent B reaches the Finished state, its application program interface will transmit a message denoting the occurrence of that event, which will in turn satisfy Agent A's pre-condition finish dependency on Agent B.

Figure 3:
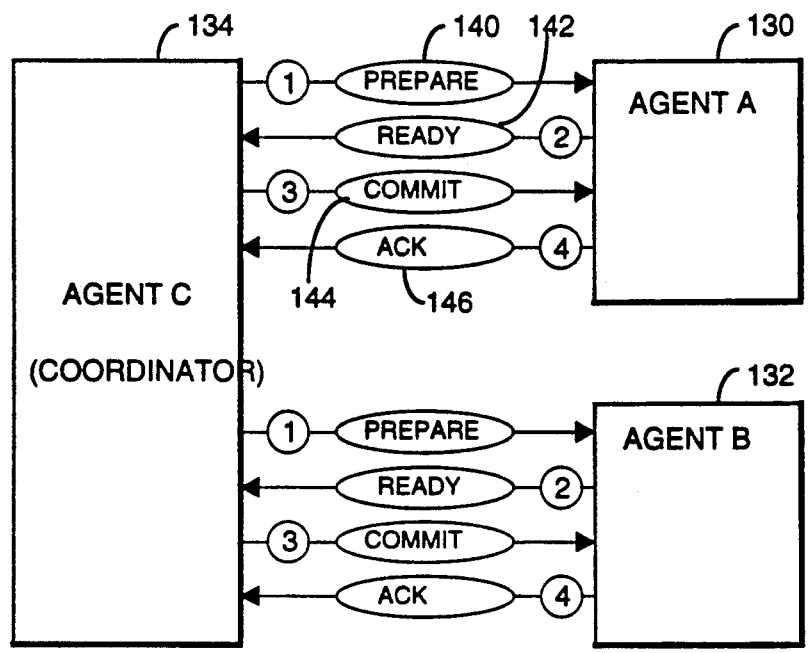
FIG. 3 schematically depicts the protocol known as two phase commit.
Figure 9:
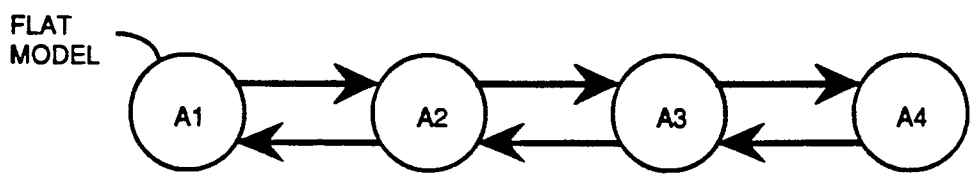
FIG. 9 depicts a flat transactional model.

Flat Transactional Model. In a distributed transaction processing system using a flat transactional model, all the agents of a transaction have a mutual strong commit dependency on at least one other agent, resulting a set of dependency relationships as shown in FIG. 9. This is equivalent to the "standard" two phase commit model described above with reference to FIG. 3 in the "Background of the Invention" section of this document. The flat transactional model makes the entire transaction an atomic unit of work, both from the outside viewpoint and from the internal viewpoint.

Nested Transactional Model. In a transactional processing system with nested agents, there are parent agents and child agents, with each child agent typically having been created by or for its parent agent. All of the nested models shown in FIGS. 10A, 10B and 10C require that child agents finish before parent agents (i.e., that the parent agent be finish dependent on the child). The model in FIG. 10A further requires that the child agent be strong commit dependent on the parent agent, and that the parent agent be weak commit dependent on the child agent. The result of all these dependencies is that the transaction appears to be an atomic unit of work from the outside viewpoint, but internally the transaction is not atomic for brief periods of time. In particular, if a parent agent is finish dependent and weak commit dependent on a child agent, and the child agent aborts, the parent agent need not abort. The parent agent's application software may be designed to handle this contingency, for example, by creating a new child agent, or by taking other exception handling actions.

It should be noted that the state table 260 of a parent agent which is weak commit dependent on a child agent may change during the course of a transaction. Initially, the parent agent will have a state table corresponding to a finish dependency on the child agent. When and if the child agent finishes, and sends a finish event message to the parent, the parent will become strong commit dependent on the child agent, requiring a change in its state table.

Figure 10A:
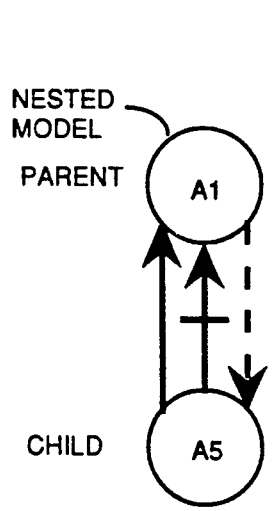
FIGS. 10A, 10B and 10C depict three types of nested transactional models.
Figure 10B:
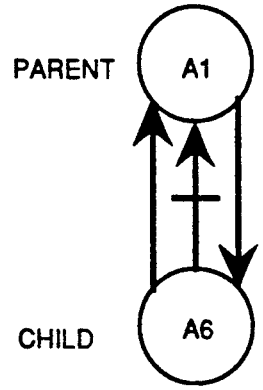
Figure 10C:
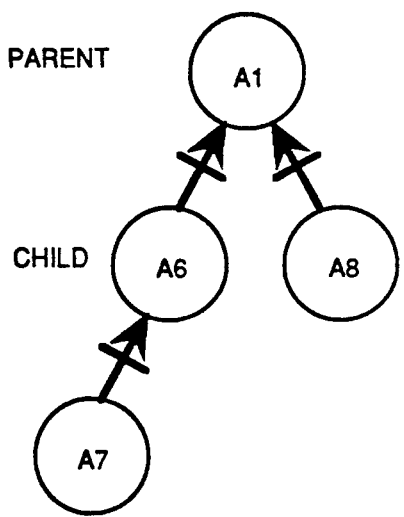

The nested transactional model in FIG. 10B has nesting without partial rollbacks, which means that this is the same as a flat transactional model except for the finish ordering requirement. Finally, the nested transactional model shown in FIG. 10C is simply an ordering requirement without any commit dependencies. This last model is primarily used for controlling resource sharing.

Figure 11A:
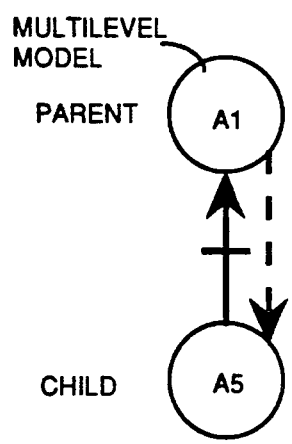
FIGS. 11A and 11B depicts two open-nested transactional models.
Figure 11B:
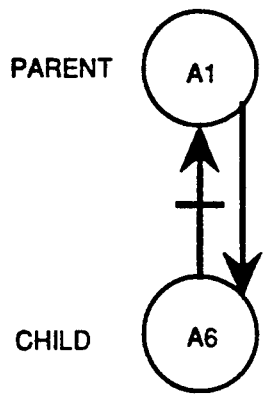

The models shown in FIGS. 11A and 11B are open-nested models, which must have a different type of rollback mechanism than the nested model of FIG. 10A. In particular, a child agent may commit long before its parent, resulting in a transaction which is not an atomic unit of work. Further, weak commit dependencies can be used to allow system resources to be released for use by other transactions as soon as possible and to allow a parent application to recover from an error which causes a child agent to abort. Mutual strong commit dependencies tends to lock up resources until an entire transaction is completed, whereas weak commit dependencies allow resources to be reallocated earlier.

Figure 12:
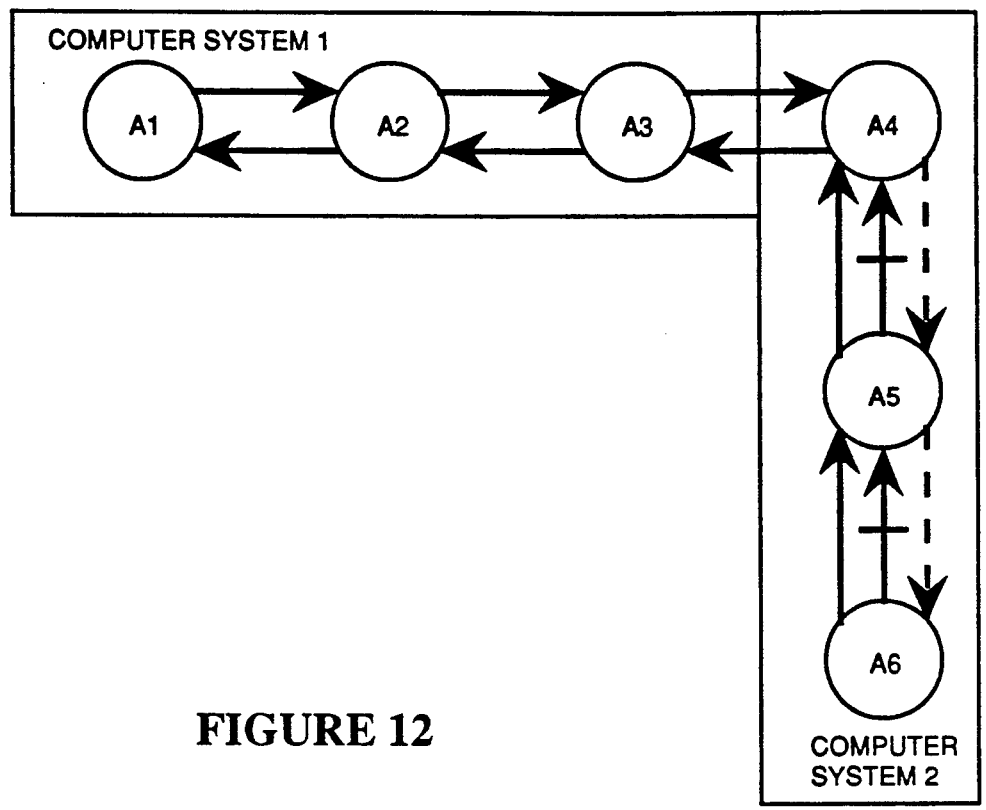
FIG. 12 depicts the agents of a transaction using a mixture of flat and nested transaction models.

FIG. 12 depicts a transaction using a mixture of the flat and nested models. This type of transaction can arise when two different types of computer systems, with different transactional models, are participating in a single transaction. It can also arise in complex transactions within a single computer system. In either case, the present invention allows agents using different types of transactional models to participate in a single transaction without having to reprogram the underlying commit protocols (herein dependency relationships).

Figure 13A:
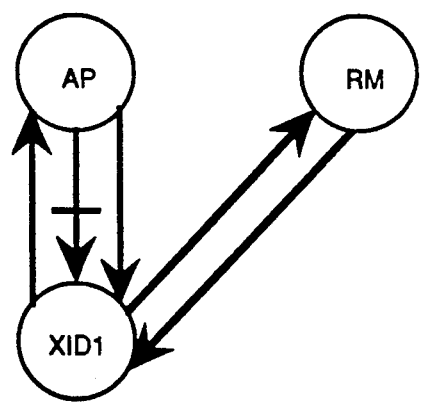
FIGS. 13A and 13B depicts agents and their interdependencies for a transaction using a resource server in two different computer settings.
Figure 13B:
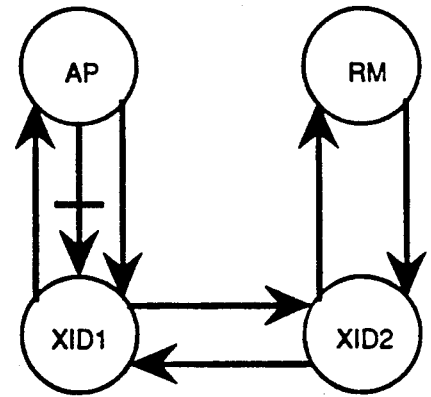

FIGS. 13A and 13B depict examples of the agents and their interdependencies for a transaction using a resource server. Each application program and resource program has an associated agent. When the application program and resource server both reside on the same node of a computer network, the configuration shown in FIG. 13A is used. In particular, when the application program makes a call to the resource server, the XID1 agent is created to handle the coordination of activities between the application program agent and the resource server agent.

When the application program and resource server reside on different nodes of a computer network, the configuration shown in FIG. 13B is used. In particular, two agents XID1 and XID2 are needed in this example to coordinate the activities of the application program agent and the resource server agent.

The following are examples of pre-conditions and post-transition actions for specific types of dependencies.

AGENT A; STRONG COMMIT DEPENDENT ON AGENT B:
PRE-CONDITIONS IN AGENT A
Commit by A requires: Commit by Agent B
POST-TRANSITION ACTIONS BY AGENT B
Upon Commit, send Commit message to Agent A
Upon Abort, send Abort message to Agent A
AGENT A: WEAK COMMIT DEPENDENT ON AGENT B:
PRE-CONDITIONS IN AGENT A
Commit by Agent A requires:
(Finish and Commit by Agent B)
OR (Not Finish and Abort by Agent B)
POST-TRANSITION ACTIONS BY AGENT B
Upon Finish, send Finish message to Agent A
Upon Commit, send Commit message to Agent A
Upon Abort, send Abort message to Agent A
AGENT A: FINISH DEPENDENCY ON AGENT B
PRE-CONDITIONS IN AGENT A
Finish by Agent A requires:
Finish by Agent B
OR (Not Finish and Abort by Agent B)
POST-TRANSITION ACTIONS BY AGENT B -continued

```
Upon Finish, send Finish message to Agent A
Upon Abort, send Abort message to Agent A
AGENT A: MUTUAL STRONG COMMIT DEPENDENCY
  WITH AGENT B:
PRE-CONDITIONS IN BOTH AGENTS
Prepared by This Agent requires:
 (Request Prepared Message from Other Agent)
 OR (Transaction Coordinator = This Agent)
Commit by This Agent requires:
 Commit or Prepared by Other Agent
POST-TRANSITION ACTIONS BY BOTH AGENTS
Upon Preparing, if This Agent is Transaction Coordinator:
send Request Prepared message to Other Agent
Upon Prepared, if This Agent is not Transaction Coordinator:
send Prepared message to Other Agent
Upon Commit, if This Agent is Transaction Coordinator:
send Commit Message to Other Agent
Upon Abort, send Abort Message to Other Agent (note that
Abort cannot be initiated by This Agent after it has prepared)
```

RESOURCE CONFLICT RESOLUTION

For the purposes of this discussion, a "resource" is any portion of a computer system which can be used by a process. For most purposes, each distinct resource can be considered to be a set of memory locations, such as a record in a database, a page of memory, a file, or some other unit which is indivisible for purposes of having two or more processes share that resource. A potential resource conflict occurs whenever one agent (or other process) requests access to a resource that is already being used by another agent. In certain cases, due to an established relationship between a set of agents, it is acceptable to allow those agents simultaneous access to a resource, in which case the potential conflict is resolved by allowing the requestor access to the resource held by the other agent. In other cases the request for access must be denied, and the requestor is put on a wait list which is checked periodically to determine if conditions in the system have changes so as to make the resource needed by the requestor available to the requestor (e.g., if the resource holder has released the resource and no other agent has submitted an earlier request for access).

Resource sharing is subject to pre-conditions in much the same way that state transitions are subject to pre-conditions. If a particular resource (e.g., a block of memory at a particular address)is being used by Agent A, there needs to be a rule or predicate which determines whether any other Agent B is to be allowed either read or write access to that same block of memory. In the preferred embodiment, the pre-conditions or predicates for such resource sharing are based on the existence or nonexistence of dependencies between the first agent to use the resource and the requesting agent. This will be explained in more detail below.

Figure 14:
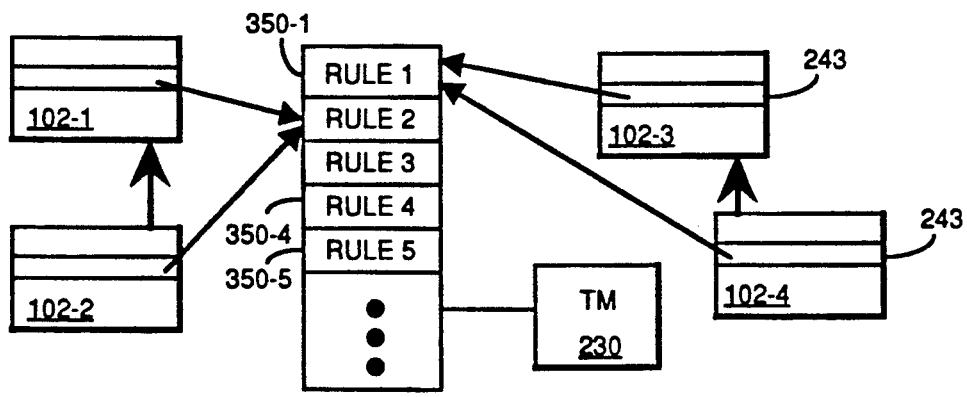
FIG. 14 depicts agents of distinct transactions, each utilizing a distinct resource conflict resolution rule.

Referring to FIG. 14, in the preferred embodiment each transaction is assigned one of five predefined resource conflict resolution rules 350. In other words, there are five distinct resource conflict resolution rules 350, any one of which can be used to resolve a potential resource conflict.

Whenever a resource manager 204 (see FIG. 4) encounters a potential resource conflict, it sends a message to the transaction manager 230 asking the transaction manager 230 to resolve the potential conflict. This message specifies the transaction ID of the agent 102-1 which first gained access to the resource and the transaction ID of the agent 102-2 which is requesting access to that same resource. The transaction manager 230 determines which, if any, of these rules applies to this conflict, thereby determining whether access by the requesting agent is allowed, and sends a message to the resource manager 204 specifying how the conflict is to be resolved.

In the preferred embodiment, the agent which first gained access to a particular resource is called alternatively "the active agent" or "the resource holder". If the requesting agent is part of the same transaction as the active agent, then the specified resource conflict resolution rule for the transaction governs. If the requesting agent is not part of the same transaction as the active agent (which currently has access to the resource), access will be denied and the requesting agent will be forced to wait.

In other embodiments of the invention, if the two agents were not members of the same transaction, it would be possible in some cases for the transaction manager to create a new dependency between the two agents, such as a strong commit dependency by the requesting agent 102-2 on the active agent 102-1. This would create the relationship necessary to allow shared access to a resource. Of course, there might have to be restrictions on when such new dependencies could be generated by the transaction manager.

An important aspect of the resource sharing aspect of the present invention is that the selection of a conflict resolution rule is independent of the predicates or protocols used for synchronizing events by the event synchronization system. In transaction processing systems, this means that a number of different resource sharing arrangements can be used, independent of the specific commit protocol being used for any particular transaction, thereby providing the ability to tailor the resource sharing rules used for particular types or models of transactions.

Each rule 350 is actually a routine used by the transaction manager to make a resource sharing decision. The five conflict resolution rules provided by the preferred embodiment are as follows:

RULE 1: Shared access by distinct agents is not allowed until the active agent commits.

RULE 2: Shared access is allowed if and only if the requesting agent is strong commit dependent on the active agent.

RULE 3: Shared access is allowed, after the active agent finishes (and thus before it commits) if and only if the requesting agent is strong commit dependent on the active agent or there is a chain of strong commit dependencies which make the requesting agent indirectly strong commit dependent on the active agent. p1 RULE 4: Shared access is allowed between agents that are peers, after the active agent finishes (and thus before it commits) if and only if (1) the requesting agent is strong commit dependent on the active agent or there is a chain of strong commit dependencies which make the requesting agent indirectly strong commit dependent on the active agent, and (2) all agents, if any, in the chain of dependencies between the requesting agent and the active agent are finished.

RULE 5: Shared access is allowed in a nested transaction, after the resource holder finishes, if and only if (1) the requesting agent is directly or indirectly strong commit dependent on the resource holder and (2) all agents in the chain of dependencies between the resource holder and the least common ancestor of the requestor and resource holder are finished. In a nested transaction with a tree of related agents, the "least common ancestor" is the least removed agent which is a parent, directly or indirectly, of both agents.

Rule 1 is the most restrictive in that it basically disallows resource sharing until commit. Rule 2 corresponds generally to the resource sharing rules used in prior art transaction processing systems made by Digital Equipment Corporation and Tandem. Rules 3 and 4 are resource sharing rules for flat transaction models which use a "fast commit" protocol. Rule 5 is appropriate for nested transaction models. As will be understood by those skilled in the art, other embodiments of the present invention may use a variety of other resource conflict resolution rules.

ALTERNATE EMBODIMENTS

As described above, each agent in a distributed computation generates "events" as it progresses through a sequence of state transitions. Thus the terms "event" and "state transition" are used synonymously. A distributed computation system comprises a finite set of two or more agents connected by a communications network. The actual means of communication between agents will vary from environment to environment.

The history of a system can be completely described by an ordered list of events in the system's agents, and is thus similar to a "trace". Correctness criteria for the joint behavior of a system (i.e., a group of agents) are specified in the present invention in terms of predicates. The predicates are then used to derive the necessary protocols to be followed by each agent. In general, protocols allow an agent in one state to move to a plurality of other states, but limit the set of states to which the agent may move. The protocols or predicates of a system allow for non-deterministic behavior of agents, but constrain that behavior so as to comply with certain specified rules. Thus, a system's predicates constrain the set of system histories which may occur, but do not specifically require any one particular order of events. Protocols, such as (but not limited to) commit protocols, are implicitly enforced by defining the minimum set of corresponding predicates or dependencies between agents. In alternate embodiments of the present invention, predicates may be expressed as constraints on a system's possible histories through the specification, for instance, of legal event paths or condition/action pairs.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

APPENDIX 1

| | FINISH | REQPRE | PREPAR | COMMIT | FORGET | REQFPR | ABORT |
|---|---|---|---|---|---|---|---|
| STATE TRANSITION TABLE FOR DEPENDENCIES = NFD | | | | | | | |
| ACTIVE | TCM_ER2 | TCM_ER2 | TCM_ER2 | TCM_ER2 | TMC_FOR | TCM_ER2 | TCM_ABT |
| FINISHING | TCM_ER2 | TCM_ER2 | TCM_ER2 | TCM_ER2 | TMC_ER2 | TCM_ER2 | TCM_ER2 |
| FINISHED | TCM_ER2 | TCM_ER2 | TCM_ER2 | TCM_ER2 | TMC_FOR | TCM_ER2 | TCM_ABT |
| PREPARING | TCM_ER2 | TCM_ER2 | TCM_ER2 | TCM_ER2 | TMC_ER2 | TCM_ER2 | TCM_ER2 |
| PREPARED | TCM_ER2 | TCM_ER2 | TCM_ER2 | TCM_ER2 | TMC_ER2 | TCM_ER2 | TCM_ER2 |
| COMMITTING | TCM_ER2 | TCM_ER2 | TCM_ER2 | TCM_ER2 | TMC_ER2 | TCM_ER2 | TCM_ER2 |
| FORGOTTEN | TCM_ER2 | TCM_ER2 | TCM_ER2 | TCM_ER2 | TMC_ER2 | TCM_ER2 | TCM_ER2 |
| STATE TRANSITION TABLE FOR DEPENDENCIES = FD | | | | | | | |
| ACTIVE | TMC_FIN | TCM_ER2 | TCM_ER2 | TCM_ER2 | TMC_FOR | TCM_ER2 | TCM_ABT |
| FINISHING | TMC_FIN | TCM_ER2 | TCM_ER2 | TCM_ER2 | TMC_ER1 | TCM_ER2 | TCM_ABT |
| FINISHED | TMC_ER1 | TCM_ER2 | TCM_ER2 | TCM_ER2 | TMC_FOR | TCM_ER2 | TCM_ABT |
| PREPARING | TMC_ER2 | TCM_ER2 | TCM_ER2 | TCM_ER2 | TMC_ER2 | TCM_ER2 | TCM_ER2 |
| PREPARED | TMC_ER2 | TCM_ER2 | TCM_ER2 | TCM_ER2 | TMC_ER2 | TCM_ER2 | TCM_ER2 |
| COMMITTING | TMC_ER2 | TCM_ER2 | TCM_ER2 | TCM_ER2 | TMC_ER2 | TCM_ER2 | TCM_ER2 |
| FORGOTTEN | TMC_ER2 | TCM_ER2 | TCM_ER2 | TCM_ER2 | TMC_ER2 | TCM_ER2 | TCM_ER2 |
| STATE TRANSITION TABLE FOR DEPENDENCIES = NFD, FD | | | | | | | |
| ACTIVE | TMC_FIN | TCM_ER2 | TCM_ER2 | TCM_ER2 | TMC_FOR | TCM_ER2 | TCM_ABT |
| FINISHING | TMC_FIN | TCM_ER2 | TCM_ER2 | TCM_ER2 | TMC_ER1 | TCM_ER2 | TCM_ABT |
| FINISHED | TMC_ER1 | TCM_ER2 | TCM_ER2 | TCM_ER2 | TMC_FOR | TCM_ER2 | TCM_ABT |
| PREPARING | TMC_ER2 | TCM_ER2 | TCM_ER2 | TCM_ER2 | TMC_ER2 | TCM_ER2 | TCM_ER2 |
| PREPARED | TMC_ER2 | TCM_ER2 | TCM_ER2 | TCM_ER2 | TMC_ER2 | TCM_ER2 | TCM_ER2 |
| COMMITTING | TMC_ER2 | TCM_ER2 | TCM_ER2 | TCM_ER2 | TMC_ER2 | TCM_ER2 | TCM_ER2 |
| FORGOTTEN | TMC_ER2 | TCM_ER2 | TCM_ER2 | TCM_ER2 | TMC_ER2 | TCM_ER2 | TCM_ER2 |
| STATE TRANSITION TABLE FOR DEPENDENCIES = NSCD | | | | | | | |
| ACTIVE | TMC_FIN | TCM_ER2 | TCM_ER2 | TCM_ER2 | TMC_FOR | TCM_ER2 | TCM_ABT |
| FINISHING | TMC_ER2 | TCM_ER2 | TCM_ER2 | TCM_ER2 | TMC_ER2 | TCM_ER2 | TCM_ER2 |
| FINISHED | TMC_ER1 | TCM_ER2 | TCM_ER2 | TCM_ER2 | TMC_FOR | TCM_ER2 | TCM_ABT |
| PREPARING | TMC_ER2 | TCM_ER2 | TCM_ER2 | TCM_ER2 | TMC_ER2 | TCM_ER2 | TCM_ER2 |
| PREPARED | TMC_ER2 | TCM_ER2 | TCM_ER2 | TCM_ER2 | TMC_ER2 | TCM_ER2 | TCM_ER2 |
| COMMITTING | TMC_ER1 | TCM_ER2 | TCM_ER2 | TCM_ER2 | TMC_ER2 | TCM_ER2 | TCM_ER2 |
| FORGOTTEN | TMC_ER2 | TCM_ER2 | TCM_ER2 | TCM_ER2 | TMC_ER1 | TCM_ER2 | TCM_ER1 |
| STATE TRANSITION TABLE FOR DEPENDENCIES = NFD, NSCD | | | | | | | |
| ACTIVE | TMC_FIN | TCM_ER2 | TCM_ER2 | TCM_ER2 | TMC_FOR | TCM_ER2 | TCM_ABT |
| FINISHING | TMC_ER2 | TCM_ER2 | TCM_ER2 | TCM_ER2 | TMC_ER2 | TCM_ER2 | TCM_ER2 |
| FINISHED | TMC_ER1 | TCM_ER2 | TCM_ER2 | TCM_ER2 | TMC_FOR | TCM_ER2 | TCM_ABT |
| PREPARING | TMC_ER2 | TCM_ER2 | TCM_ER2 | TCM_ER2 | TMC_ER2 | TCM_ER2 | TCM_ER2 |
| PREPARED | TMC_ER2 | TCM_ER2 | TCM_ER2 | TCM_ER2 | TMC_ER2 | TCM_ER2 | TCM_ER2 |
| COMMITTING | TMC_ER2 | TCM_ER2 | TCM_ER2 | TCM_ER2 | TMC_ER2 | TCM_ER2 | TCM_ER2 |
| FORGOTTEN | TMC_ER1 | TCM_ER2 | TCM_ER2 | TCM_ER2 | TMC_ER1 | TCM_ER2 | TCM_ER1 |
| STATE TRANSITION TABLE FOR DEPENDENCIES = FD, NSCD | | | | | | | |
| ACTIVE | TMC_FIN | TCM_ER2 | TCM_ER2 | TCM_ER2 | TMC_FOR | TCM_ER2 | TCM_ABT |
| FINISHING | TMC_FIN | TCM_ER2 | TCM_ER2 | TCM_ER2 | TMC_ER1 | TCM_ER2 | TCM_ABT |
| FINISHED | TMC_ER1 | TCM_ER2 | TCM_ER2 | TCM_ER2 | TMC_FOR | TCM_ER2 | TCM_ABT |

APPENDIX 1-continued

|  | FINISH | REQPRE | PREPAR | COMMIT | FORGET | REQFPR | ABORT |
|---|---|---|---|---|---|---|---|
| PREPARING | TMC_ER2 | TCM_ER2 | TCM_ER2 | TCM_ER2 | TMC_ER2 | TCM_ER2 | TCM_ER2 |
| PREPARED | TMC_ER2 | TCM_ER2 | TCM_ER2 | TCM_ER2 | TMC_ER2 | TCM_ER2 | TCM_ER2 |
| COMMITTING | TMC_ER2 | TCM_ER2 | TCM_ER2 | TCM_ER2 | TMC_ER2 | TCM_ER2 | TCM_ER2 |
| FORGOTTEN | TMC_ER1 | TCM_ER2 | TCM_ER2 | TCM_ER2 | TMC_ER1 | TCM_ER2 | TCM_ER1 |

STATE TRANSITION TABLE FOR DEPENDENCIES = NFD, FD, NSCD

|  | FINISH | REQPRE | PREPAR | COMMIT | FORGET | REQFPR | ABORT |
|---|---|---|---|---|---|---|---|
| ACTIVE | TMC_FIN | TCM_ER2 | TCM_ER2 | TCM_ER2 | TMC_FOR | TCM_ER2 | TCM_ABT |
| FINISHING | TMC_FIN | TCM_ER2 | TCM_ER2 | TCM_ER2 | TMC_ER1 | TCM_ER2 | TCM_ABT |
| FINISHED | TMC_ER1 | TCM_ER2 | TCM_ER2 | TCM_ER2 | TMC_FOR | TCM_ER2 | TCM_ABT |
| PREPARING | TMC_ER2 | TCM_ER2 | TCM_ER2 | TCM_ER2 | TMC_ER2 | TCM_ER2 | TCM_ER2 |
| PREPARED | TMC_ER2 | TCM_ER2 | TCM_ER2 | TCM_ER2 | TMC_ER2 | TCM_ER2 | TCM_ER2 |
| COMMITTING | TMC_ER2 | TCM_ER2 | TCM_ER2 | TCM_ER2 | TMC_ER2 | TCM_ER2 | TCM_ER2 |
| FORGOTTEN | TMC_ER1 | TCM_ER2 | TCM_ER2 | TCM_ER2 | TMC_ER1 | TCM_ER2 | TCM_ER1 |

STATE TRANSITION TABLE FOR DEPENDENCIES = SCD

|  | FINISH | REQPRE | PREPAR | COMMIT | FORGET | REQFPR | ABORT |
|---|---|---|---|---|---|---|---|
| ACTIVE | TMC_FIN | TCM_ER2 | TCM_ER2 | TCM_CMT | TMC_ER2 | TCM_ER2 | TCM_ABT |
| FINISHING | TMC_ER2 | TCM_ER2 | TCM_ER2 | TCM_ER2 | TMC_ER2 | TCM_ER2 | TCM_ER2 |
| FINISHED | TMC_ER1 | TCM_ER2 | TCM_ER2 | TCM_CMT | TMC_ER2 | TCM_ER2 | TCM_ABT |
| PREPARING | TMC_ER2 | TCM_ER2 | TCM_ER2 | TCM_ER2 | TMC_ER2 | TCM_ER2 | TCM_ER2 |
| PREPARED | TMC_ER2 | TCM_ER2 | TCM_ER2 | TCM_ER2 | TMC_ER2 | TCM_ER2 | TCM_ER2 |
| COMMITTING | TMC_ER1 | TCM_ER2 | TCM_ER2 | TCM_ER1 | TMC_ER2 | TCM_ER2 | TCM_ABT |
| FORGOTTEN | TMC_ER2 | TCM_ER2 | TCM_ER2 | TCM_ER2 | TMC_ER2 | TCM_ER2 | TCM_ER1 |

STATE TRANSITION TABLE FOR DEPENDENCIES = NFD, SCD

|  | FINISH | REQPRE | PREPAR | COMMIT | FORGET | REQFPR | ABORT |
|---|---|---|---|---|---|---|---|
| ACTIVE | TMC_FIN | TCM_ER2 | TCM_ER2 | TCM_CMT | TMC_FOR | TCM_ER2 | TCM_ABT |
| FINISHING | TMC_ER2 | TCM_ER2 | TCM_ER2 | TCM_ER2 | TMC_ER2 | TCM_ER2 | TCM_ER2 |
| FINISHED | TMC_ER1 | TCM_ER2 | TCM_ER2 | TCM_CMT | TMC_FOR | TCM_ER2 | TCM_ABT |
| PREPARING | TMC_ER2 | TCM_ER2 | TCM_ER2 | TCM_ER2 | TMC_ER2 | TCM_ER2 | TCM_ER2 |
| PREPARED | TMC_ER2 | TCM_ER2 | TCM_ER2 | TCM_ER2 | TMC_ER2 | TCM_ER2 | TCM_ER2 |
| COMMITTING | TMC_ER1 | TCM_ER2 | TCM_ER2 | TCM_ER1 | TMC_ER2 | TCM_ER2 | TCM_ABT |
| FORGOTTEN | TMC_ER2 | TCM_ER2 | TCM_ER2 | TCM_ER2 | TMC_ER2 | TCM_ER2 | TCM_ER2 |

STATE TRANSITION TABLE FOR DEPENDENCIES = FD, SCD

|  | FINISH | REQPRE | PREPAR | COMMIT | FORGET | REQFPR | ABORT |
|---|---|---|---|---|---|---|---|
| ACTIVE | TMC_FIN | TCM_ER2 | TCM_ER2 | TCM_CMT | TMC_ER2 | TCM_ER2 | TCM_ABT |
| FINISHING | TMC_FIN | TCM_ER2 | TCM_ER2 | TCM_CMT | TMC_ER2 | TCM_ER2 | TCM_ABT |
| FINISHED | TMC_ER1 | TCM_ER2 | TCM_ER2 | TCM_CMT | TMC_ER2 | TCM_ER2 | TCM_ABT |
| PREPARING | TMC_ER2 | TCM_ER2 | TCM_ER2 | TCM_ER2 | TMC_ER2 | TCM_ER2 | TCM_ER2 |
| PREPARED | TMC_ER2 | TCM_ER2 | TCM_ER2 | TCM_ER2 | TMC_ER2 | TCM_ER2 | TCM_ER2 |
| COMMITTING | TMC_ER1 | TCM_ER2 | TCM_ER2 | TCM_ER1 | TMC_ER2 | TCM_ER2 | TCM_ABT |
| FORGOTTEN | TMC_ER2 | TCM_ER2 | TCM_ER2 | TCM_ER2 | TMC_ER2 | TCM_ER2 | TCM_ER2 |

STATE TRANSITION TABLE FOR DEPENDENCIES = NDF, FD, SCD

|  | FINISH | REQPRE | PREPAR | COMMIT | FORGET | REQFPR | ABORT |
|---|---|---|---|---|---|---|---|
| ACTIVE | TMC_FIN | TCM_ER2 | TCM_ER2 | TCM_CMT | TMC_FOR | TCM_ER2 | TCM_ABT |
| FINISHING | TMC_FIN | TCM_ER2 | TCM_ER2 | TCM_CMT | TMC_ER2 | TCM_ER2 | TCM_ABT |
| FINISHED | TMC_ER1 | TCM_ER2 | TCM_ER2 | TCM_CMT | TMC_FOR | TCM_ER2 | TCM_ABT |
| PREPARING | TMC_ER2 | TCM_ER2 | TCM_ER2 | TCM_ER2 | TMC_ER2 | TCM_ER2 | TCM_ER2 |
| PREPARED | TMC_ER2 | TCM_ER2 | TCM_ER2 | TCM_ER2 | TMC_ER2 | TCM_ER2 | TCM_ER2 |
| COMMITTING | TMC_ER1 | TCM_ER2 | TCM_ER2 | TCM_ER1 | TMC_ER2 | TCM_ER2 | TCM_ABT |
| FORGOTTEN | TMC_ER2 | TCM_ER2 | TCM_ER2 | TCM_ER2 | TMC_ER2 | TCM_ER2 | TCM_ER2 |

...

STATE TRANSITION TABLE FOR DEPENDENCIES = Mutual SCD

|  | FINISH | REQPRE | PREPAR | COMMIT | FORGET | REQFPR | ABORT |
|---|---|---|---|---|---|---|---|
| ACTIVE | TMC_FIN | TCM_RQP | TCM_PRE | TCM_ER1 | TMC_FOR | TCM_FPR | TCM_ABT |
| FINISHING | TMC_ER2 | TCM_ER2 | TCM_ER2 | TCM_ER2 | TMC_ER2 | TCM_ER2 | TCM_ER2 |
| FINISHED | TMC_ER1 | TCM_RQP | TCM_ER1 | TCM_ER1 | TMC_ER1 | TCM_FPR | TCM_ABT |
| PREPARING | TMC_ER1 | TCM_ER1 | TCM_PRE | TCM_CMT | TMC_ER1 | TCM_ER1 | TCM_ABT |
| PREPARED | TMC_ER1 | TCM_IGN | TCM_ER1 | TCM_CMT | TMC_ER1 | TCM_ER1 | TCM_ABT |
| COMMITTING | TMC_ER1 | TCM_ER1 | TCM_ER1 | TCM_ER1 | TMC_FOR | TCM_ER1 | TCM_ER1 |
| FORGOTTEN | TMC_ER1 | TCM_ER1 | TCM_ER1 | TCM_ER1 | TMC_ER1 | TCM_ER1 | TCM_ER1 |

...

STATE TRANSITION TABLE FOR DEPENDENCIES = NFD, FD, NSCD, SCD, Mutual SCD

|  | FINISH | REQPRE | PREPAR | COMMIT | FORGET | REQFPR | ABORT |
|---|---|---|---|---|---|---|---|
| ACTIVE | TMC_FIN | TCM_RQP | TCM_PRE | TCM_CMT | TMC_FOR | TCM_FPR | TCM_ABT |
| FINISHING | TMC_FIN | TCM_RQP | TCM_ER2 | TCM_CMT | TMC_ER1 | TCM_ER2 | TCM_ER2 |
| FINISHED | TMC_ER1 | TCM_RQP | TCM_ER1 | TCM_CMT | TMC_ER1 | TCM_FPR | TCM_ABT |
| PREPARING | TMC_ER1 | TCM_ER1 | TCM_PRE | TCM_CMT | TMC_ER1 | TCM_ER1 | TCM_ABT |
| PREPARED | TMC_ER1 | TCM_IGN | TCM_ER1 | TCM_CMT | TMC_ER1 | TCM_ER1 | TCM_ABT |
| COMMITTING | TMC_ER1 | TCM_ER1 | TCM_ER1 | TCM_ER1 | TMC_FOR | TCM_ER1 | TCM_ABT |
| FORGOTTEN | TMC_ER1 | TCM_ER1 | TCM_ER1 | TCM_ER1 | TMC_ER1 | TCM_ER1 | TCM_ER1 |

What is claimed is:

1. In a computer system, a method of performing distributed computations, the steps of the method performed by said computer system comprising:

provdiding a set of cooperating computational agents to perform each distributed computation, each computational agent being programmed to progress through a sequence of state transitions among a predefined set of states;

defining and storing in at least one computer memory a plurality of distinct predicates that can be assigned to ones of said computational agents, each distinct predicate specifying a distinct state transition dependency between state transitions of first and second specified ones of said computational agents; each said defined predicate specifying a state transition of said first computational agent that is to be blocked until said second computational agent performs a specified action that satisfies said each defined predicate; wherein a first one of said plurality of defined predicates is a mutual strong commit dependency predicate that requires said specified first and second computational agents to commit a distributed computation's results only when said first and second computational agents mutually agree to commit said distributed computation's results and otherwise requires said first and second computational agents not to commit said distributed computation's results; and wherein a second one of said plurality of defined predicates is a finish dependency predicate that determines which of said specified first and second computational agents must finish a corresponding portion of said distributed computation before the other of said specified first and second computational agents;

dynamically assigning a set of predicates to the set of computational agents performing each distributed computation so as to define a corresponding set of state transition interdependencies said set of computational agents; wherein each assigned predicate is selected from said plurality of predicates, and different sets of predicates are assigned to the sets of computational agents for different distributed computations; storing in at least one computer memory dependency data for each said computational agent specifying (A) a first set of state transitions of said each computational agent that are to be blocked, (B) preconditions for allowing each of said first set of state transitions to proceed, (C) a second set of state transitions of said each computation agent that are preconditions for state transitions by other ones of said computational agents for which each of said second set of state transitions are preconditions;

performing each distributed computation with said set of computational agents provided for that distributed computation, including blocking state transitions by ones of said set computational agents in accordance with said predicates assigned to said set of computational agents, and allowing each said blocked state transition to proceed when said action specified by the corresponding predicate is performed.

2. The method of performing distributed computations of claim 1, said performing step including: upon each state transition in each one of said computational agents, when said stored dependency data indicates that said state transition is a pre-condition for state transitions by other specified ones of said computational agents, sending messages to said other specified ones of said computational agents notifying that said state transition has taken place;

receiving said messages from other ones of said computational agents; and when a state transition by one of said computational agents is blocked, waiting to receive messages corresponding to said pre-conditions specified by said stored dependency data for said blocked state transition, and allowing said blocked state transition to proceed when said messages corresponding to said specified pre-conditions are received.

3. The method of performing distributed computations of claim 1, further including:

providing resources to be accessed by said computational agents;

establishing a plurality of distinct resource conflict resolution rules for determining whether to allow any specified two of said computational agents to share access to any of said resources;

each of said plurality of resource conflict resolution rules including (A) distinct dependency criteria requiring predefined state transition dependencies between state transitions of said any specified two computational agents as a precondition for allowing said two computational agents to share access to any of said resources; at least one of said plurality of resources conflict resolution rules including (B) timing criteria for allowing shared access to any of said resources only after specified state transitions occur; and when a first one of said computational agents has access to any one of said resources and a second one of said computational agents requests access to the same one resource, selecting one of said plurality of resource conflict resolution rules, if any, having dependency criteria satisfied by said first and second computational agents, and allowing said second computational agent to share access to said one resource with said first computational agent in accordance with said selected resource resolution rule.

4. The method of performing distributed computations of claim 1, wherein a third one of said plurality of defined predicates is a strong commit dependency predicate that requires said specified first computational agent to commit results computed by said first computational agent only when said specified second computational agent will commit results computed by said second computational agent.

5. The method of performing distributed computations of claim 1, wherein a fourth one of said plurality of defined predicates is a weal commit dependency predicate that prevents said specified first computational agent from committing results computed by said first computational agent when said second computational agent succeeds in finishing a portion of said distributed computation corresponding to said second computational agent unless said second computational agent will commit results computed by said second computational agent.

6. A computer system for performing distributed computations, comprising:

a set of cooperating computational agents for performing each distributed computation, each computational agent being programmed to progress through a sequence of state transitions among a predefined set of states;

at least one computer memory;

a plurality of distinct predicates, stored in said computer memory, that can be assigned to ones of said computational agents, each distinct predicate specifying a distinct state transition dependency between state transitions of first and second specified ones of said computational agents; each said distinct predicate specifying a state transition of said first computational agent that is to be blocked until said second computational agent performs a specified action that satisfies said each distinct predicate; wherein a first one of said plurality of distinct predicates is a mutual strong commit dependency predicate that requires said specified first and second computational agents to commit a distributed computation's results only when said first and second computational agents mutually agree to commit said distributed computation's results and otherwise requires said first and second computational agents not to commit said distributed computation's results; and wherein a second one of said plurality of distinct predicates is a finish dependency predicate that determines which of said specified first and second computational agents must finish a corresponding portion of said distributed computation before the other of said specified first and second computational agents; said distributed computation coordinator including means for storing in at least one computer memory dependency data for each said computational agent specifying (A) a first set of state transitions of said each computational agent that are to be blocked, (B) preconditions for allowing each of said first set of state transitions to proceed, (C) a second set of state transitions of said each computational agent that are preconditions for state transitions by other ones of said computational agents for which each of said second set of state transitions are preconditions;

a distributed computation coordinator for dynamically assigning a set of predicates to the set of computational agents performing each distributed computation so as to define a corresponding set of state transition interdependencies between said set of computational agents; wherein each assigned predicate is selected from said plurality of predicates, and different sets of predicates are assigned to the sets of computational agents for different distributed computations;

means for performing each distributed computation with said set of computational agents for that distributed computation;

said set of computational agents for each distributed computation including means for blocking state transitions by said set of computational agents in accordance with said predicates assigned to said set of computational agents; and said distributed computation coordinator including means for allowing each said blocked state transition to proceed when said action specified by the corresponding predicate is performed.

7. The computer system of claim 6, said distributed computation coordinator including means for responding to each state transition in each one of said computational agents, when said stored dependency data indicates that said state transition is a pre-condition for state transitions by other specified ones of said computational agents, by sending messages to said other specified ones of said computational agents notifying that said state transition has taken place;

each of said computational agents including means for receiving said messages from other ones of said computational agents, and for waiting to receive messages corresponding to said pre-conditions specified by said stored dependency data when a state transition by said each computational agent is blocked, and for allowing said blocked state transition to proceed when said messages corresponding to said specified pre-conditions are received.

8. The computer system of claim 6, further including:

resources to be accessed by said computational agents;

a plurality of distinct resource conflict resolution rules, stored in said at least one computer memory, for determining whether to allow any specified two of said computational agents to share access to any of said resources;

each of said plurality of resource conflict resolution rules including (A) distinct dependency criteria requiring predefined state transition dependencies between state transitions of said any specified two computational agents as a precondition for allowing said two computational agents to share access to any of said resources; at least one of said plurality of resource conflict resolution rules including (B) timing criteria for allowing shared access to any of said resources only after specified state transitions occur; and said distributed computation coordinator including resource conflict resolution means; said resource conflict resolution means, when a first one of said computational agents has access to any one of said resources and a second one of said computational agents requests access to the same one resource, selecting one of said plurality of resource conflict resolution rules, if any, having dependency criteria satisfied by said first and second computational agents, and allowing said second computational agent to share access to said one resource with said first computational agent in accordance with said selected resource conflict resolution rule.

9. The computer system of claim 6, wherein a third one of said plurality of distinct predicates is a strong commit dependency predicate that requires said specified first computational agent to commit results computed by said first computational agent only when said specified second computational agent will commit results computed by said second computational agent.

10. The computer system of claim 9, wherein a fourth one of said plurality of distinct predicates is a weak commit dependency predicate that prevents said specified first computational agent from committing results computed by said first computational agent when said second computational agent succeeds in finishing a portion of said distributed computation corresponding to said second computational agent unless said second computational agent will commit results computed by said second computational agent.

11. In a computer system, a method of performing distributed computations, the steps of the method performed by said computer system comprising:

providing a set of cooperating computational agents to perform each distributed computation, each computational agent being programed to progress through a sequence of state transitions among a predefined set of states;

defining and storing in at least one computer memory a plurality of distinct predicates that can be assigned to ones of said computational agents, each distinct predicate specifying a distinct state transition dependency between state transitions of first and second specified ones of said computational agents; each said defined predicate specifying a state transition of said first computational agent that is to be blocked until said second computational agent performs a specified action that satisfies said each defined predicate;

dynamically assigning a set of predicates to the set of computational agents performing each distributed computation so as to define a corresponding set of state transition interdependencies between said set of computational agents; wherein each assigned predicate is selected from said plurality of predicates, and different sets of predicates are assigned to the sets of computational agents for different distributed computations;

performing each distributed computation with said set of computational agents provided for that distributed computation, including blocking state transitions by ones of said set computational agents in accordance with said predicates assigned to said set of computational agents, and allowing each said blocked state transition to proceed when said action specified by the corresponding predicate is performed;

providing resources to be accessed by said computational agents;

establishing a plurality of distinct resource conflict resolution rules for determining whether to allow any specified two of said computational agents to share access to any of said resources;

each of said plurality of resource conflict resolution rules including (A) distinct dependency criteria requiring predefined state transition dependencies between state transitions of said any specified two computational agents as a precondition for allowing said two computational agents to share access to any of said resources; at least one of said plurality of resource conflict resolution rules including (B) timing criteria for allowing shared access to any of said resources only after specified state transitions occur; and when a first one of said computational agents has access to any one of said resources and a second one of said computational agents requests access to the same one resource, selecting one of said plurality of resource conflict resolution rules, if any, having dependency criteria satisfied by said first and second computational agents, and allowing said second computational agent to share access to said one resource with said first computational agent in accordance with said selected resource conflict resolution rule.

12. A computer system for performing distributed computations, comprising:
   a set of cooperating computational agents for performing each distributed computation, each computational agent being programmed to progress through a sequence of state transitions among a predetermined set of states;
   at least one computer memory;
   a plurality of distinct predicates, stored in said computer memory, that can be assigned to ones of said computational agents, each distinct predicate specifying a distinct state transition dependency between state transitions of first and second specified ones of said computational agents; each said distinct predicate specifying a state transition of said first computational agent that is to be blocked until said second computational agent performs a specified action that satisfies said each distinct predicate;
   a distributed computation coordinator dynamically assigning a set of predicates to the set of computational agents performing each distributed computation so as to define a corresponding set of state transition interdependencies between said set of computational agents; wherein each assigned predicate is elected from said plurality of predicates, and different sets of predicates are assigned to the sets of computational agents for different distributed computations;
   means for performing each distributed computation with said set of computational agents for that distributed computation;
   said set of computational agents for each distributed computation including means for blocking state transitions by said set of computational agents in accordance with said predicates assigned to said set of computational agents; and
   said distributed computation coordinator including means for allowing each said blocked state transition to proceed when said action specified by the corresponding predicate is performed;
   resources to be accessed by said computational agents;
   a plurality of distinct resource conflict resolution rules, stored in said at least one computer memory, for determining whether to allow any specified two of said computational agents to share access to any of said resources;
   each of said plurality of resource conflict resolution rules including (A) distinct dependency criteria requiring predefined state transition dependencies between state transitions of said any specified two computational agents as a precondition for allowing said two computational agents to share access to any of said resources; at least one of said plurality of resource conflict resolution rules including (B) timing criteria for allowing shared access to any of said resources only after specified state transitions occur; and
   said distributed computation coordinator including resource conflict resolution means; said resource conflict resolution means, when a first one of said computational agents has access to any one of said resources and a second one of said computational agents requests access to the same one resource, selecting one of said plurality of resource conflict resolution rules, if any, having dependency criteria satisfied by said first and second computational agents, and allowing said second computational agent to share access to said one resource with said first computational agent in accordance with said selected resource conflict resolution rule.

* * * * *

UNITED STATES PATENT AND TRADEMARK OFFICE
CERTIFICATE OF CORRECTION

PATENT NO. : 5,329,626
DATED : July 12, 1994
INVENTOR(S) : Johannes Klein et al.

It is certified that error appears in the above-identified patent and that said Letters Patent is hereby corrected as shown below:

<u>Title page, Item [54] and Column 1, line 2,</u>
Title, after "PROCESSING" delete "INCLUDES" and insert therefor
-- INCLUDING --

<u>Column 19,</u>
Lines 26-27, delete "computation" and insert therefor -- computational --

<u>Column 20,</u>
Line 5, delete "resources" and insert therefor -- resource --
Line 19, after "resource" insert -- conflict --
Line 30, delete "weal" and insert therefor -- weak --

Signed and Sealed this

Twenty-first Day of June, 2005

JON W. DUDAS
*Director of the United States Patent and Trademark Office*